Figure 1:
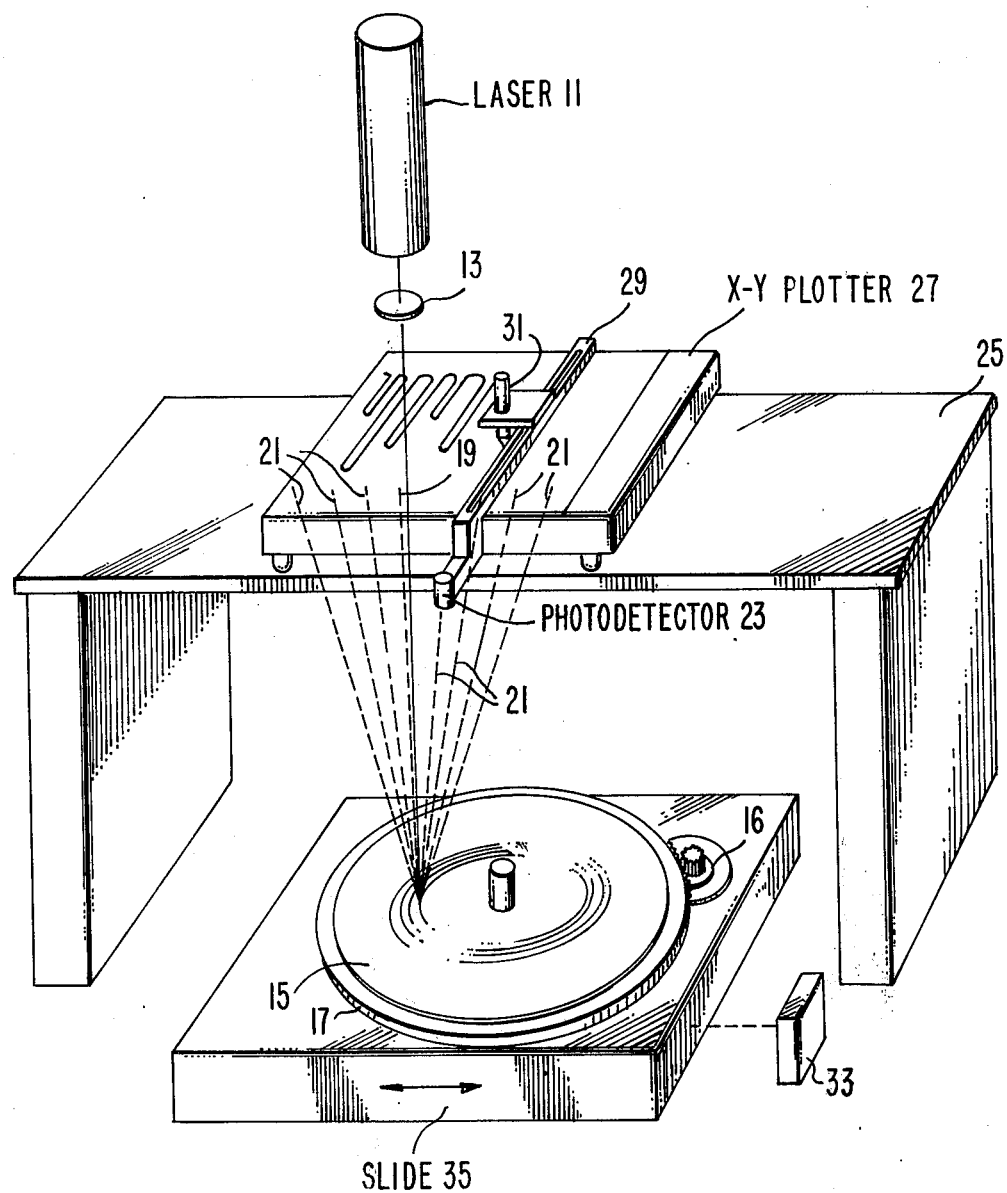

United States Patent [19]

Roach et al.

[11] 4,155,098
[45] May 15, 1979

[54] GROOVE DEPTH ESTIMATION SYSTEM USING DIFFRACTIVE GROOVE EFFECTS

[75] Inventors: William R. Roach, Rocky Hill; Istvan Gorog, Princeton, both of N.J.

[73] Assignee: RCA Corporation, New York, N.Y.

[21] Appl. No.: 810,736

[22] Filed: Jun. 28, 1977

[51] Int. Cl.² .................. G01D 5/39; G01N 21/32; H04N 5/76
[52] U.S. Cl. ............................ 358/128; 179/100.3 G; 179/100.3 V; 250/550; 250/562; 250/572; 346/33 F; 356/237
[58] Field of Search ................ 179/100.3 E, 100.3 G, 179/100.3 V, 100.4 R, 100.4 M, 100.4 C, 100.41 L, 100.1 B; 358/127, 128; 365/124; 346/33 F, 33 A; 250/550, 562, 572; 356/111, 237

[56] References Cited

U.S. PATENT DOCUMENTS

| | | | |
|---|---|---|---|
| 3,287,563 | 11/1966 | Clunis | 179/100.41 L |
| 3,833,769 | 9/1974 | Compaan et al. | 179/100.3 V |
| 3,860,766 | 1/1975 | Mori | 179/100.4 R |
| 3,909,517 | 9/1975 | Clemens | 179/100.1 B |
| 3,919,465 | 11/1975 | Adler et al. | 179/100.3 G |
| 3,992,593 | 11/1976 | Heine | 179/100.3 V |
| 4,030,835 | 6/1977 | Firester et al. | 356/111 |
| 4,064,539 | 12/1977 | Lewiner | 179/100.4 M |
| 4,069,484 | 1/1978 | Firester et al. | 346/33 F |

*Primary Examiner*—Raymond F. Cardillo, Jr.
*Attorney, Agent, or Firm*—Eugene M. Whitacre; Joseph S. Tripoli; Jerald E. Roehling

[57] ABSTRACT

Groove depth estimation apparatus provides an incident light beam which illuminates the surface of a grooved disc with a light spot that spans a plurality of convolutions of the groove. The structure of the groove convolutions serves as a diffraction grating which reflects the incident light beam into a plurality of diverging beams of light. A photodetector provides measurements of the light power in the respective reflected beams. Calculator circuits are provided for deriving from the photodetector measurements estimation of the average groove depth in the region illuminated by the light spot.

9 Claims, 4 Drawing Figures

GROOVE DEPTH ESTIMATION SYSTEM USING DIFFRACTIVE GROOVE EFFECTS

The present invention relates generally to optical detection systems, and particularly to optical detection systems which may be employed to provide, in a regularly grooved surface, such as a video disc of the type described in U.S. Pat. No. 3,842,194 issued to Jon K. Clemens, an estimation of groove depth.

The groove depth estimation principles of the present invention are illustratively applicable and will be described with reference to optical inspection of spiral grooves for video disc records at various manufacturing stages throughout the record mastering and replicating processes, i.e., both prior to the utilization of the groove as an information track, as well as after information has been recorded therein.

In one illustrative process of producing a video disc record having spiral grooves, a disc master (to be used for recording) is formed by (1) mechanically cutting a spiral groove of a trapezoidal cross-section in a copper-coated aluminum disc, and (2) coating the grooved surface with electron beam sensitive material. The coated disc is mounted on a turntable of an electron beam disc recorder in the path of a finely focused beam of electrons, that is turned on and off in response to a recording signal, to expose various portions of the groove bottom as the disc is rotated and translated with respect to the impinging beam to form signal elements. Those portions of the groove bottom struck by the electron beam are removed by subsequent development of the sensitive material. After exposure and development, the master disc has the relief pattern that is desired for the final records which comprises a groove which is approximately sinusoidal in cross-section. Molds for making stampers for producing production line records are made from these masters. In the final stages of manufacturing a video disc, a vinyl substrate is formed with the desired relief pattern, using a stamper made from a mold; the substrate is coated with a metal by a vacuum sputtering process; the metal is coated with a styrene dielectric by a glow discharge process; and the styrene is coated with a layer of oil by an evaporation process.

In the processes for manufacturing a video disc record, such as the type supra, formulation of a uniform spiral groove free of significant variations in its depth is an important factor for obtaining high quality video signal recordings. Each stage of record manufacture can be a critical stage wherein undesirable variations in groove depth that affect the production of quality video records must be minimized.

In accordance with the principles of the present invention, an optical groove depth estimation system is provided for forming a light beam, using light from a coherent light source, and directing the beam at a disc having a grooved surface. The incident light beam which is focused at a point near the disc surface, illuminates the grooved surface with a light spot having a half-intensity contour that spans a plurality of groove convolutions. The axis of the incident beam path lies in a nonparallel relationship, and at a chosen angle (e.g., 2°), with respect to the central axis of the disc. The incident beam axis is desirably positioned in a plane which is perpendicular to the disc surface and intersects the grooved surface along a tangent to a groove convolution at the point of incidence.

The illuminated portion of the groove convolutions effectively forms a diffraction grating, which is uniform in the absence of defects. The effect of the diffraction grating on light reflected from the grooved surface is to form an undeviated zero diffraction order beam of light and deviated higher diffraction order beams of light which diverge in a fan pattern from the point of incidence on the disc surface with the relative light power contained in the respective beams being determined by groove shape (i.e., groove depth and transverse of the groove elongation cross-sectional dimensions). A photodetector is positioned so that its photosensitive surface is successively brought in registry with the path of several of the reflected beams of light (e.g., the zero diffraction order beam of light and the higher diffraction order beams of light up to the fifth order). The photodetector light sensitive surface is large enough to collect substantially all of the light within any one of the respective reflected beams, so as to provide an output indicative of the total light power contained in any one reflected beam. The photodetector output, as it is successively brought in registry with the respective reflected beams, provides a measurement of the relative light powers of the beams.

In further accordance with the principles of the present invention, the measured light power contained in the respective reflected beams is utilized as a basis for estimating groove depth. The output of the photodetector, as it scans along the reflected beams, being representative of the measured power in the respective reflected light beams, is compared to sets of theoretically derived values for light power in corresponding diffraction orders of an infinite plane wave incident on the assumed local groove shape (e.g., of the aforementioned sinusoidal cross-section) as a function of groove depth. The result of this comparison provides an estimated groove depth value, which yields the best least squares fit between the measured values and the corresponding theoretical values. While system reproducibility in estimating groove depth is high, the accuracy of the estimated groove depth value will depend upon how well the theoretical groove shape approximates the actual groove shape under inspection.

In accordance with one aspect of the present invention, relative motion between the grooved surface and the incident beam is established in such a manner that a succession of regions of the grooved surface are scanned by the incident light beam in a circular pattern. Since the grooved disc cannot be assumed to be precisely axially symmetric, the diffraction spectrum, generated by the diffraction of the incident light beam off the grooved surface of the disc is affected by the aforesaid relative motion. However, in practice, the azimuthal dependence of the measured diffraction spectrum is small and the powers in the various orders can be averaged over a chosen radius of the grooved disc, and, therefore, the derived groove depth estimate, based on average light power in the respectively measured reflected beams is representative of an "average groove depth" at the inspected radius of the disc.

In accordance with yet another aspect of the present invention, the output signal of the photodetector, as it is successively brought in registry with the path of the respective reflected beams of light, is advantageously used as the Y input to a conventional X-Y plotter. The X input to the plotter is the position of the photodetector as it is translated across the reflected beams of light in a plane which is parallel to the inspected grooved disc. The output of the X-Y plotter is a hard-copy representation of the relative spacing and the relative light power in the respective diffraction order beams of light reflected from the illuminated groove region. From this graph of light power as function of position, a simple geometric representation is obtained of the relative light power in the respective reflected beams. Since asymmetry is sometimes introduced into the diffraction pattern when signal elements are recorded off center in the groove, a detailed examination of the spectrum thus represented can readily provide an estimate of the position of the signal elements recorded in the groove. Moreover, the width and shape of the respective light power peaks recorded by the X-Y plotter provide an indication of the alignment of the optical elements of the system during the scanning operation, and thus enable an accurate adjustment thereof.

Figure 2:
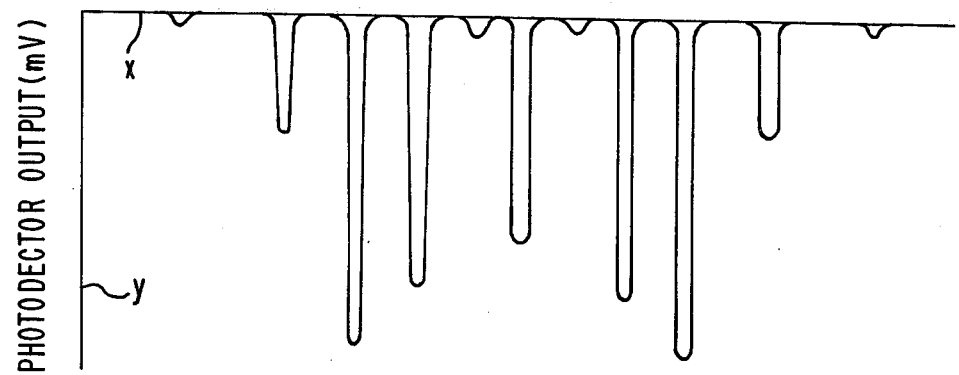
Figure 3:
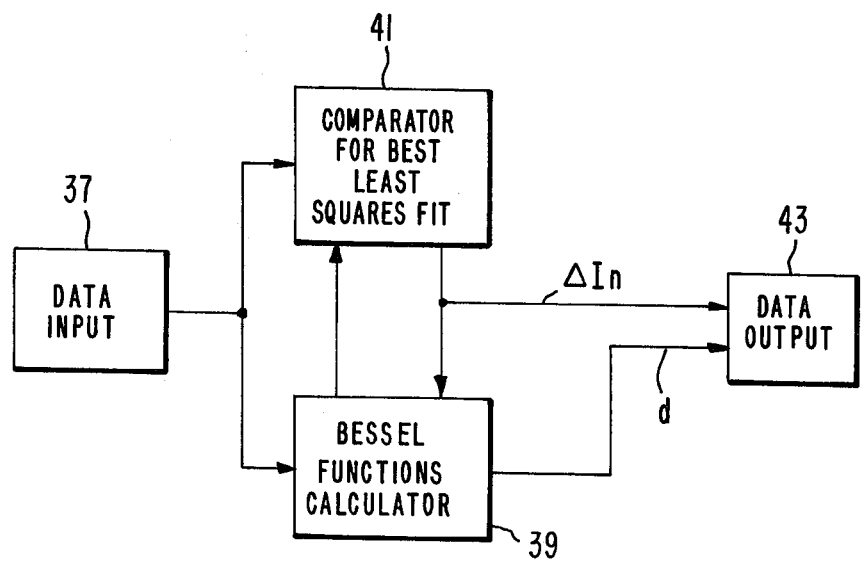

In the accompanying drawings:

FIG. 1 illustrates, in a perspective view, an apparatus forming a portion of a groove depth estimation system embodying the principles of the present invention;

FIG. 2 illustrates an interference pattern of maxima and minima produced by illuminating a plurality of grooves on the grooved surface with a coherent light beam, as produced by an X-Y plotter of the apparatus of FIG. 1; and FIG. 3 illustrates a calculating apparatus, forming another portion of a groove estimation system embodying the principles of the present invention, for processing the information generated by the apparatus of FIG. 1.

Figure 4:
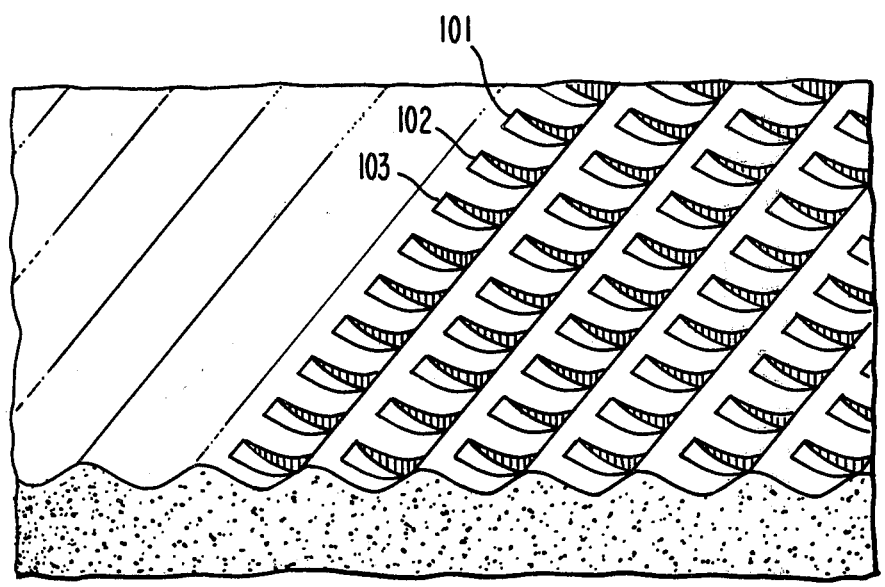

FIG. 4 illustrates in isometric form a portion of a video disc surface having a sinusoidal pattern of groove convolutions with signal elements recorded therein.

Referring to FIG. 1, a coherent light beam from a light source 11 (illustratively, in the form of a laser) can be focused by a lens 13 toward a focus point near the surface of a grooved disc 15 supported on a turntable 17. The focused beam illuminates the grooved surface with a light spot having a half intensity contour that spans a plurality of groove convolutions.

In order that the zero diffraction order beam may be conveniently measured, the orientation of the incident beam is desirably such that the axis of the incident beam lies at a slight angle (e.g., 2°) to the central axis of the record and lies in a plane which is perpendicular to the disc and which is tangent to the groove. In addition to making the zero order beam accessible for measurement, this orientation will produce a symmetrical diffraction pattern if the grooves are symmetrical.

The groove structure in the illuminated region, provides a regular pattern of depressions and elevations, which serves as a diffraction grating (with a grating pitch determined by the groove convolution pitch and a depth determined by the bare groove and including an average contribution from signal elements, if any are present) to diffract the light reflected by the illuminated record surface region in a fixed pattern. In the isometric illustration of FIG. 4 a cross-section of a video disc is taken transverse of the groove elongation. The cross-section illustrates a sinusoidal groove structure having a regular pattern of elevations and depressions. Pits 101, 102 and 103 illustrate signal elements recorded along the groove elongation. As disclosed in U.S. patent application Ser. No. 810,735 of W. R. Roach filed on May 28, 1977, the signal elements may have a sinusoidal pattern along the groove elongation. This light diffraction results in the formation of an undeviated zero diffraction order beam of light 19 and a plurality of additional, deviated beams of light 21 corresponding to higher diffraction orders diverging in a fan pattern from the illuminated grooved surface.

A photodetector 23 is positioned on a platform 25 so that its photosensitive surface is successively brought in registry with the path of the diffraction order beams of light 19, 21 (e.g., the zero diffraction order beam of light and the higher diffraction order beams of light up to the fifth order). The photodetector is translated along a plane which is parallel to the illuminated disc surface.

Advantageously, photodetector 23 is combined with an X-Y plotter 27 to provide a hard-copy of the relative light power in the respective diffraction orders intercepted by the photodetector 23. By mounting photodetector 23 on a slide 29 of the X-Y plotter, the position of the photodetector 23 as it is radially translated is readily indicated on one of the axis of the plotter. The output of the photodetector which is a measure of the light power incident thereon, is applied to a drive circuit (not shown) for a writing pen 31 whose longitudinal position along slide 29 is made to correspond to the magnitude of the output of the photodetector. Therefore, the X-Y plotter traces on an appropriate medium a record of the relative light power intercepted by the photodetector as a function of photodetector position.

In FIG. 2, a representative pattern of interference maxima and minima produced by illuminating a plurality of groove convolutions with the coherent light beam emitted from light source 11 of FIG. 1, intercepted by the photodetector, is shown in a format produced by the X-Y plotter of FIG. 1. The symmetry of the illustrated peaks about the zero diffraction order peak being indicative of groove symmetry. Flat rounded peaks of the recorded diffraction orders provide an indication of proper optical alignment of the various elements of the estimation system.

Where an average groove depth estimation value is desired at a given radius of the disc 15, the disc is rotated by means of a turntable motor 16 (shown in FIG. 1). The disc 15 may also be translated in a radial direction (e.g., through use of a suitable drive source 33 to effect translation of a slide 35 upon which the motor driven turntable 17 is supported) to provide readings at selected radii of the disc.

FIG. 3 illustrates a calculating apparatus for deriving, from the information generated by the photodetector an estimated value of groove depth. The block diagram form of FIG. 3 could represent a functional flow diagram for a digital computer programmed with a standard engineering language (e.g., Fortran). Information derived from the plotted relative light powers of the reflected beams are applied to a data input stage 37 along with an estimated range for the groove depth and the transverse cross-sectional groove shape of the disc record. Illustratively, the operation of the calculating apparatus will also be explained with reference to a groove having the aforementioned sinusoidal cross-section.

It will be appreciated that for a uniform infinite wave front incident on a one dimensional diffraction grating the light power at the nth principal maximum may be computed as:

$$I = K \left| \int_0^w e^{i(\phi(z) - \frac{2\pi nz}{w})} dz \right|^2,$$

where $\phi(z)$ is the phase retardation introduced at position z in a groove and the integration in z is over w, the width of a single groove and where K is a constant. In the case of a sinusoidal reflection grating:

$$\phi(z) = \Delta \sin \frac{2\pi z}{w},$$

where $\Delta$ is the peak to peak optical depth of the grating in radians. The light power becomes:

$$I(n) = K \left| \int_0^w e^{i(\Delta \sin \frac{2\pi z}{w} - \frac{2\pi nz}{w})} dz \right|^2.$$

which reduces to:

$$I(n) = K[J_n(\Delta)]^2.$$

where $J_n(\Delta)$ is the Bessel function of order n and argument $\Delta$.

For a bare groove the argument $\Delta$ is simply:

$$\Delta = \frac{2\pi}{\lambda} d.$$

where d is the depth of the groove and $\lambda$ is the incident beam wavelength.

Bessel function calculator stage 39, which receives the output of data input stage 37 generates a set of theoretical relative light powers for respective diffraction orders within the aforementioned given parameters. In comparator 41, this set of theoretical values is compared with the measured values after multiplication by a constant scaling factor chosen to reduce the least square error in the comparison of the theoretical to the measured spectrum. The output of comparator 41 is an error signal ($\Delta I_n$) of the squares fit between the measured and theoretical relative power values. The Bessel function calculator 39, in response to the error signal ($\Delta I_n$), generates a second set of theoretically calculated values of the relative power of the respective diffraction order cones of light for a groove depth assumed value modified in response to the error signal ($\Delta I_n$). The second set of theoretically calculated values is again compared with the measured values in comparator 41 and a second error signal ($\Delta I_n$) is generated thereby. This closed loop operation of the calculator 39 and comparator 41 is successively repeated until a best least squares fit between the theoretical and measured values is achieved. The theoretical depth value at which the best least squares fit is achieved being representative of the estimate of groove depth is then applied to a data output stage 43 along with the error signal ($\Delta I_n$) where both values can be readily retrieved.

For an illustration of an application of the principles of the present invention to a system where direct measurement of the diffraction order cones of light is accomplished, reference may be made to concurrently filed on May 28, 1977, U.S. patent application Ser. No. 810,735, of W. R. Roach. In that application, a photodetector array is arranged so that each photodetector in the array intercepts one of a plurality of the diffraction beams of light reflected from an illuminated region of a grooved disc. Calculating apparatus, directly coupled to the outputs of the respective photodetectors in the array, process the measured light power data to derive therefrom an estimate of groove depth.

What is claimed is:

1. Apparatus, for use with a flat surface which is regularly grooved with groove segments of a given transverse cross-sectional shape, for estimating groove depth; said apparatus comprising:

means for illuminating a region of the grooved surface, the illuminated region being sufficiently large to span a plurality of groove segments;

the structure of the groove segments in the surface region illuminated serving as a diffraction grating for diffracting light reflected from said illuminated region to form respectively separated diffraction order beams of light;

means for separately detecting and providing a measure of the light power contained in each of a plurality of said diffraction order beams of light; and means for deriving an estimate of groove depth for the given transverse cross-sectional shape of the groove in accordance with the output of said measure providing means.

2. Apparatus in accordance with claim 1 wherein said detecting means includes:

a photodetector; and means for establishing relative motion between said photodetector and a plurality of said diffraction order beams of light in a manner causing translation of said photodetector along a path which comprises a plurality of said diffraction order beams of light.

3. Apparatus in accordance with claim 2 further comprising:

a recording medium;

writing means for inscribing marks on said recording medium; and means for establishing relative motion between said recording medium and said writing means in a manner causing said writing means to traverse said recording medium along (1) a first path in synchronization with the translation of said photodetector and (2) a second path in response to the output of said photodetector.

4. Apparatus in accordance with claim 1 wherein said estimate deriving means includes:

actuatable means for generating a set of light power values for respective diffraction order beams of light reflected from a flat surface which is regularly grooved with groove segments of said given cross-sectional shape and an assumed groove depth value;

actuatable means for comparing the output of said generating means with the output of said detecting means;

actuatable means for modifying the assumed groove depth value in response to the output of the comparing means; and means for repeatedly, sequentially actuating said generating, comparing and modifying means.

5. Apparatus for estimating groove depth of a spiral groove, having a given transverse cross-sectional shape, formed in a surface of a disc comprising:

means for illuminating a region of the grooved surface, the illuminated region being sufficiently large to span a plurality of groove convolutions;

the structure of the groove convolutions in the surface region illuminated serving as a diffraction grating for diffracting light reflected from said illuminated region to form respectively separated diffraction order beams of light;

means for separately detecting and providing a measure of the light power contained in each of a plurality of said diffraction order beams of light; and means for deriving an estimate of groove depth for the given transverse cross-sectional shape of the groove in accordance with the output of said measure providing means.

6. Apparatus in accordance with claim 5 further comprising means for establishing relative motion between the illuminating means and the disc surface in a manner causing the illuminating means to successively illuminate regions of the grooved surface which are at substantially equal radial distances from a center of the disc.

7. Apparatus in accordance with claim 5 wherein said detecting means includes:

a photodetector; and means for establishing relative motion between said photodetector and a plurality of said diffraction order beams of light in a manner causing translation of said photodetector along a path which intersects a plurality of said diffraction order beams of light.

8. Apparatus in accordance with claim 7 further comprising:

a recording medium;

writing means for inscribing marks on said recording medium; and means for establishing relative motion between said recording medium and said writing means in a manner causing said writing means to traverse said recording medium along (1) a first path in synchronization with the translation of said photodetector and (2) a second path in response to the output of said photodetector.

9. A method for estimating, in a regularly grooved surface having groove segments of a given cross-sectional shape, groove depth comprising:

illuminating a region of the grooved surface;

the structure of the groove segments in the surface region illuminated serving as a diffraction grating for diffracting light reflected from said illuminated region to form respectively separated diffraction order beams of light;

measuring the light power contained in each of a plurality of said diffraction order beams of light; and determining an estimate of groove depth by the comparison of the measured light power distribution with patterns of light power distribution in the respective diffraction order beams of light predetermined for said given cross-sectional shape at a variety of depths of the groove.

* * * * *